T. B. ASHFORD.
TRANSPLANTER.
APPLICATION FILED APR. 8, 1909.
952,092.
Patented Mar. 15, 1910.
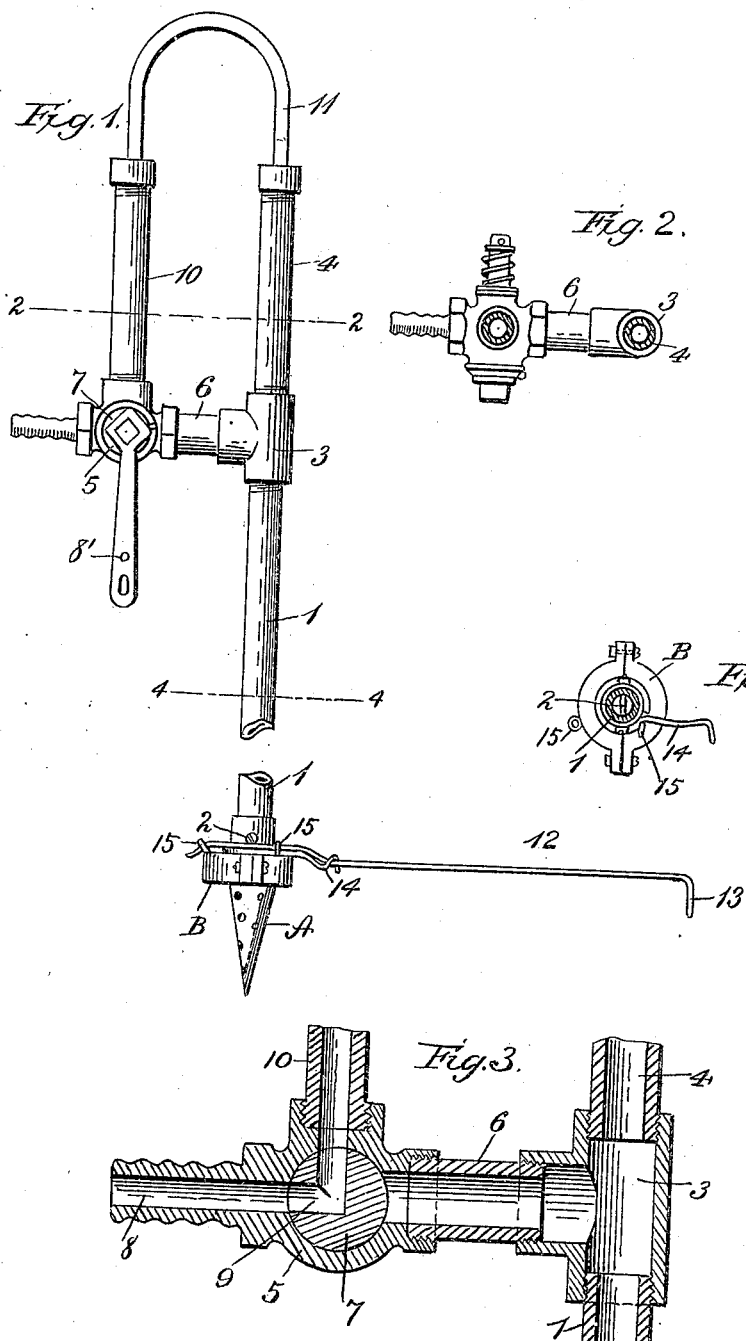
Witnesses
F. L. Ourand
M. K. Freeman
Inventor
Thomas B. Ashford
By Louis Bagger
his Attorneys

UNITED STATES PATENT OFFICE.

THOMAS B. ASHFORD, OF KINSTON, NORTH CAROLINA, ASSIGNOR OF ONE-TENTH TO E. O. MOORE, ONE-TENTH TO HUBBERT E. MOSELEY, ONE-TENTH TO EDWARD M. LAND, ONE-TENTH TO CEPHUS L. STRICKLIN, ONE-TENTH TO JOHN H. DAWSON, ONE-FIFTH TO JOSEPH STRICKLIN, AND ONE-FIFTH TO JOHN H. BARWICK, ALL OF KINSTON, NORTH CAROLINA.

TRANSPLANTER.

952,092.      Specification of Letters Patent.    Patented Mar. 15, 1910.

Application filed April 8, 1909. Serial No. 488,765.

*To all whom it may concern:*

Be it known that I, THOMAS B. ASHFORD, a citizen of the United States, residing at Kinston, in the county of Lenoir and State of North Carolina, have invented certain new and useful Improvements in Transplanters, of which the following is a specification.

My invention relates to an improvement in transplanters, for setting out tobacco, cabbage, or any other plants, and the object is to provide a perforated dibble through which a certain quantity of water is discharged after the hole has been formed by the dibble for the plant.

A further object is in the provision of means for discharging a certain quantity of water through the dibble after the opening has been formed, whereby the ground will be moistened around the plant which is placed in the hole or opening.

The invention consists in certain novel features of construction, and combinations of parts which will be hereinafter described and pointed out in the claims.

In the accompanying drawings:—Figure 1 is a view in side elevation of my device, Fig. 2 is a sectional view on the line 2—2 of Fig. 1, Fig. 3 is a sectional view through the valve and the connection connecting the pipes and valve, and Fig. 4 is a view on the line 4—4 of Fig. 1.

A, represents the dibble which is tapering or conical in shape for a short distance, and the remaining length of the dibble is cylindrical. The dibble is preferably hollow, and is perforated throughout the tapered or conical portion. The dibble is connected to a pipe 1 by a bolt 2, and a collar B which is made in two sections is clamped upon the dibble for regulating the distance the dibble is to be forced into the ground for forming the hole or opening. The collar can be placed at different elevations upon the pipe 1 so that any size hole for different plants can be formed. A coupling 3 is connected to the pipe 1, and connected to the coupling is a pipe 4.

A three-way valve 5 is connected to the coupling 4 by a short tube or pipe 6, and received in the valve is the turn plug 7 having the usual handle 8. A right angular opening 9 is formed in the plug 7 through which the water passes from the inlet opening 8 of the valve to pipe 10 which is connected with the valve 5. A hose (not shown) may be connected to the opening 8 for conducting water to the valve. The pipe 11 connects the pipes 10 and 4 to prevent the water as it is admitted to the pipe 10 from discharging from the upper end of the pipe 10 due to the force of the water supply. The pipe 11 will conduct the water which may rise above the end of the pipe 10 into the pipe 4 so that it will pass through the dibble A. Upon turning the plug 7 so that the opening 9 admits the water to the pipe or reservoir 10, the reservoir is filled from the supply, then the plug is turned, retaining the water in the pipe or reservoir 10 until the dibble has been inserted in the ground the desired depth, when the plug is turned so that the opening 9 will register with the reservoir, and the pipe 6, thereby discharging the water from the reservoir into the pipe 1, where it is conducted to the dibble, and the ground is thereby moistened sufficiently for the plant which is to be set out.

Connected to the collar B is a rod 12 which has a hooked end 13 which is adapted to mark off the distance for the next plant, so that after one hole has been formed, the operator can move up the distance which has been marked off by the hooked end 13 of the rod 12, and make another hole for the next plant, etc. The rod is held upon the collar by the curved arm 14, and the eyelets 15. The rod can be adjustably held upon the collar for regulating the length or distance between the plants. The object of marking off the distance between the plants is that provision is made for keeping the plants in a straight row, and thereby permitting of the plow passing between the rows from two directions.

In many instances, a cart or wagon is drawn on to the field upon which is mounted a barrel having water to which is connected a hose, and which hose is connected to the end 8 of the valve, and by turning the plug 7, the desired quantity of water is admitted to the reservoir 10, and after the opening has been formed, the plug is turned for discharging the water from the reservoir to the dibble through which it passes into the soil. Of course, other provision might be made for supplying water to the transplanter, and I do not care to be limited to any particular means for supplying water to the transplanter.

It will be seen that I have provided means whereby a certain quantity of water is admitted to the reservoir for each operation of the dibble in forming the hole so that each plant will receive the same amount of water, and further that provision has been made for making different sizes of holes for different plants as the roots of many plants are longer than others, and it is necessary to have different sized holes.

It is evident that more or less slight changes might be resorted to in the form and arrangement of the several parts described, without departing from the spirit and scope of my invention, and hence I do not wish to limit myself to the exact construction herein set forth, but:—

Having fully described my invention, what I claim as new and desire to secure by Letters Patent, is:—

1. A transplanter comprising a dibble having openings therein, a pipe connected thereto, a valve connected to the pipe, a reservoir connected to the valve, said valve adapted to regulate the amount of water admitted to the reservoir, and admitting water from the reservoir to the pipe.

2. A transplanter comprising a dibble having openings therein, a pipe connected thereto, a reservoir, a valve connecting the reservoir and pipe adapted to regulate the amount of water supplied to the reservoir and for discharging a certain quantity of water from the reservoir to the pipe.

3. A transplanter, comprising a pipe having a dibble, a reservoir connected to the pipe, and a valve for controlling the supply of water to the reservoir and from the reservoir to the pipe.

4. A transplanter, comprising a dibble, a pipe connected thereto, a reservoir, a valve connected to the reservoir and pipe, and an overflow pipe connecting the reservoir and pipe.

In testimony whereof I affix my signature, in the presence of two witnesses.

THOMAS B. ASHFORD.

Witnesses:
  C. A. NEALE,
  WATTS F. ESTABROOK.